Dec. 12, 1950 J. E. LASCHENSKI 2,533,477

TUNING MECHANISM

Filed Nov. 4, 1948 3 Sheets-Sheet 1

INVENTOR.
JOSEPH E. LASCHENSKI
BY
Brown, Denk & Synnestvedt
AGENTS

Dec. 12, 1950 J. E. LASCHENSKI 2,533,477

TUNING MECHANISM

Filed Nov. 4, 1948 3 Sheets-Sheet 2

INVENTOR.
JOSEPH E. LASCHENSKI
BY
Brown, Denk & Synnestvedt
AGENTS

Dec. 12, 1950 J. E. LASCHENSKI 2,533,477

TUNING MECHANISM

Filed Nov. 4, 1948 3 Sheets-Sheet 3

INVENTOR.
JOSEPH E. LASCHENSKI
BY
Brown, Denk & Synnestvedt
AGENTS

Patented Dec. 12, 1950 2,533,477

UNITED STATES PATENT OFFICE 2,533,477

TUNING MECHANISM

Joseph E. Laschenski, Springfield, Pa., assignor to Philco Corporation, Philadelphia, Pa., a corporation of Pennsylvania Application November 4, 1948, Serial No. 58,269

1 Claim. (Cl. 74—10.39)

The invention hereinafter described and claimed relates to tuning devices for radio apparatus, and is especially concerned with tuning devices that are selectively operable to effect either manual or automatic tuning of the apparatus.

More particularly, the present invention has to do with "push-button" tuning devices for radio receivers, which devices are of the type including so-called "inductance tuning," and in which there is employed a movable carriage, or core bar, adapted to position the cores of a plurality of inductors in response to the manipulation of a selected one of several manually operable control elements or buttons. While the invention, in its broadest aspect, has applicability to push-button tuners other than the inductance type, the apparatus of the invention is particularly advantageous when used with tuners of the aforesaid type, in that it provides a simple and inexpensive solution to several substantial problems which have arisen in prior devices incorporating a plurality of adjustable inductors.

In this connection, and as will be recognized by those skilled in the art to which the present invention appertains, difficulties have been encountered in providing a device in which a selected and preadjusted push-button will be effective to tune associated radio apparatus to a particular desired frequency, repetitively and with a high degree of accuracy. In tuners of the class concerned, it is common practice to provide an elongate movable carriage drivingly connected with a plurality of core members, the core members engaging the carriage, or core bar, at points spaced along the latter. In order that the apparatus may have the desired accuracy, in repetitive operation, it is necessary that the core bar move with purely rectilinear motion and that all cocking or twisting movements of said core bar be prevented. An additional difficulty has arisen, in many known tuning devices, because of the fact that the force which must be applied to a push-button, in order to actuate the tuner, has been unduly great. Attempts have been made to meet this latter difficulty by providing a solenoid, or similar electrical device, to assist in effecting movement of the core bar, and thus lessen the force which must be applied to the selected switch button. Evidently such expedients involve additional expense and complexity.

It is, therefore, an important object of the present invention to provide a tuning device of the foregoing type, which is of such a character that the carriage or bar which drives the frequency-determining elements moves with true rectilinear motion. To this general end, my invention contemplates the provision of a push-button tuner in which uniform driving motion is imparted to widely spaced portions of the carriage member.

In accordance with another aspect of the present invention, it is an important object to provide a tuning device in which the force which must be applied to the control manuals, or push-buttons, is reduced to a minimum. This feature of the apparatus is realized by providing a device the inherent nature of which is such as to require relatively few moving parts, and in which substantially all such parts move unidirectionally and rectilinearly.

It is another feature of the apparatus that a push-button latch bar is provided which—during a latching operation—moves in a novel manner requiring a minimum of force in its operation.

The apparatus of the invention is further characterized in that the change-over—as between the manual and push-button modes of tuning—is effected with a minimum of effort or attention on the part of the operator, and in which apparatus the operator may readily determine the mode of operation under which the apparatus is conditioned for operation.

The invention has as a further object the provision of a push-button tuner in which the required travel of the core members, or other frequency-determining devices employed, is attained with a very small displacement of the associated push-buttons. In accordance with this object, it is a feature of the apparatus that the ratio between push-button and core movements may be varied within substantial limits, thus making it possible to operate the tuner in such manner as to meet the spatial requirements of various types of radio apparatus.

The invention extends further to certain novel constructional features and arrangements hereinafter described, and illustrated in the accompanying drawings, in which.

First briefly described, the illustrated embodiment of the invention comprises a multi-coil inductance tuner of the key or push-button type, having a single movable carriage, or core bar, to which the core members of the tuner are secured. This carriage is mounted for reciprocatory movements to vary the frequency-determining position of the inductance cores, such movement being effected in response to manipulation of any desired one of the push-buttons. As will appear more fully in what follows, this movement is purely rectilinear in nature, means being provided to prevent any cocking movements of the core bar and resultant misadjustment of the associated inductors. Underlying the core bar is a second carriage, or key bar, engageable by any one of the push-buttons and movable (in response to displacement of the selected push-button) to a position determined by the frequency to which the selected button corresponds. It is to be noted that rectilinear movement of the key bar is insured, regardless of the point of impingement of the selected push-button against the key bar. The key bar is drivingly connected to the core bar and, for the purpose of effecting purely rectilinear movement of said core bar, the driving interconnection is such that uniform driving motion is imparted to both end portions of the core bar. A latch bar is effective to retain the selected push-button in depressed position until such time as another button is manipulated, such manipulation serving to release the push-button previously actuated, as well as to move the core bar to a position corresponding to a second desired broadcast frequency.

Figure 1:
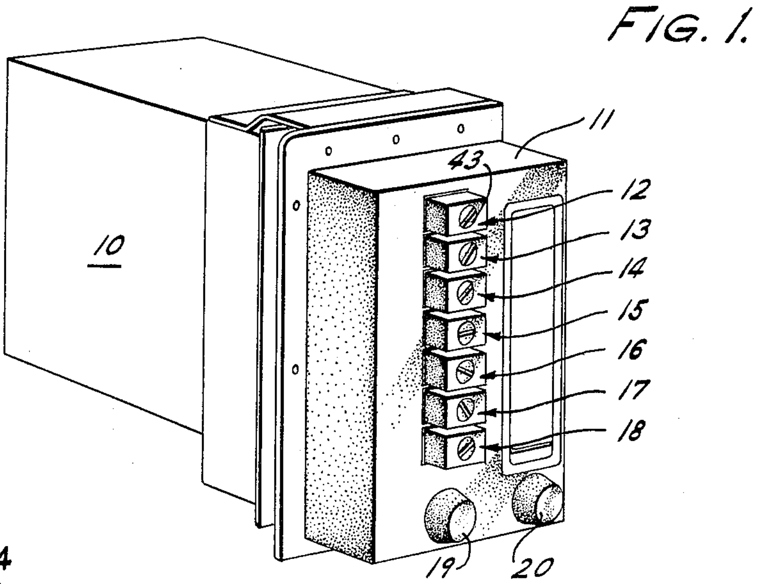
Figure 1 is a view, in perspective, of a radio receiver adapted for use in vehicles, and embodying one form of the invention.
Figure 2:
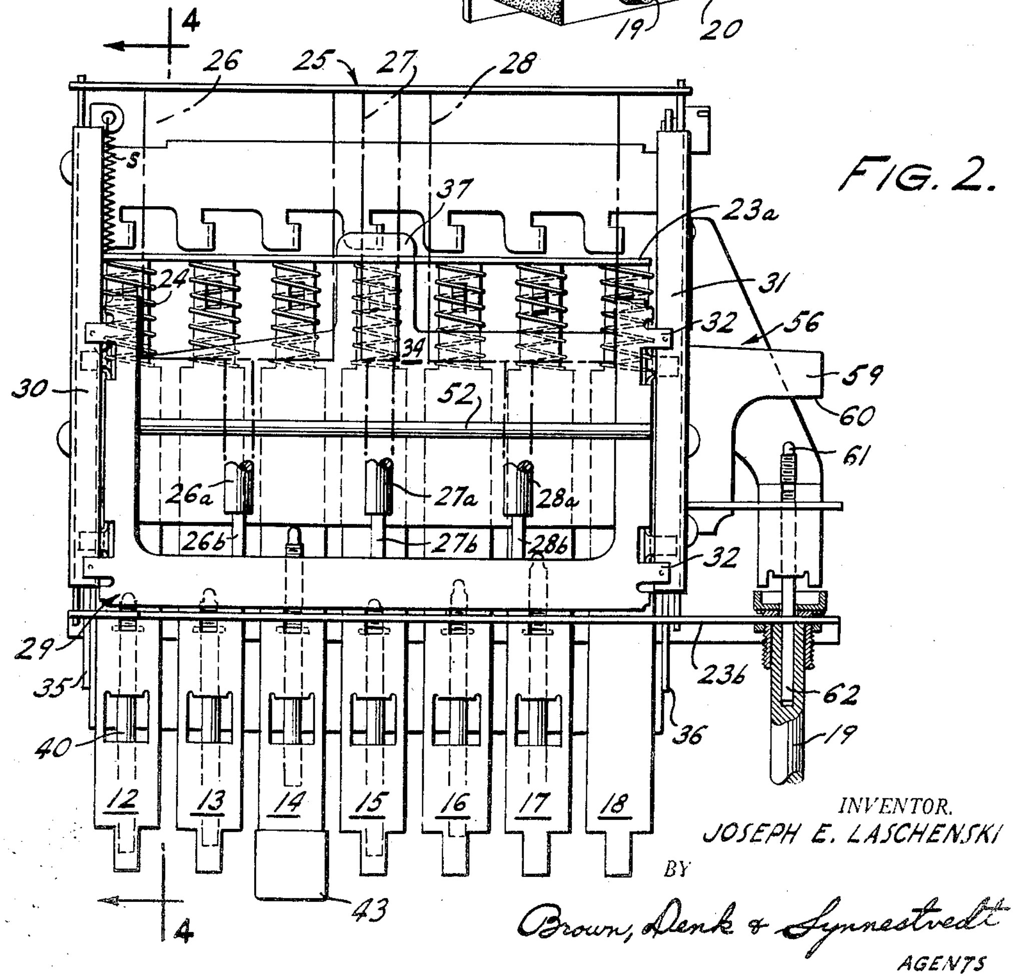
Figure 2 is a plan view of the tuning mechanism, per se, said mechanism being shown as detached from the radio apparatus and turned ninety degrees from the position shown in Figure 1.

Now making more detailed reference to the drawings and with special reference to Figures 1 and 2 thereof, there is illustrated an embodiment of the invention particularly adapted for use in automobile radio receivers. Such a receiver is designated, generally, by the reference numeral 10 (Figure 1) it being understood that the receiver embodies radio circuits which, for the purposes of the present invention, may be conventional in nature. The receiver is provided, in its forward portion, with a control panel 11 from which project seven push-button assemblies, these being designated by reference numerals 12 to 18, inclusive. A control member 19 underlies the push-button assemblies and, as will appear hereinafter, is employed under the manual mode of operation. A combined "On"-"Off" switch and volume control is provided, being indicated at 20 in Figure 1, and a suitable dial and indicator complete the controls provided.

As will be understood, manipulation of the switch 20 energizes the circuits, after which operation of the several push-buttons is effective to provide automatic selection as between a plurality of preselected broadcast frequencies.

The tuning mechanism, per se, is mounted upon a base frame or plate 21 (see particularly Figures 4 and 6), said plate being provided with a pair of spaced parallel walls or flange portions 22*a* and 22*b* which, as will later appear, provide support for both the push-button or key bar and the core bar. Additional upstanding flanges 23*a* and 23*b* extend across the base plate between the side walls 22*a* and 22*b*, said flanges 23*a* and 23*b* being provided with apertures within which the push-buttons 15 to 18 are mounted for reciprocatory movements.

Figure 6:
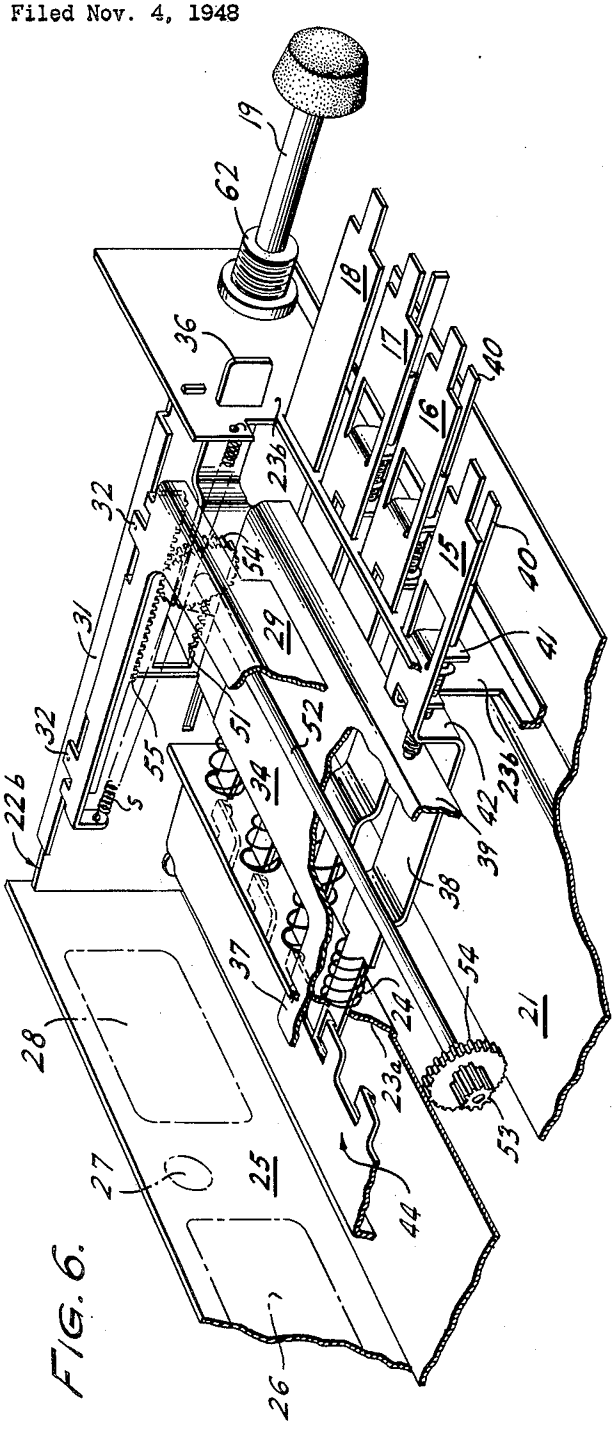
Figure 6 is a fragmentary view, in perspective, illustrative of the manner in which the mechanism operates under the automatic mode; and, Figures 7, 8 and 9 are fragmentary sectional views illustrating the construction and function of the latch bar during its cycle of operation.

As clearly appears in Figures 2 and 6, each push-button is provided with a return spring 24, said spring reacting between shoulder portions formed upon the push-button and the flange 23*a*, in such manner as to urge the push-button to the outer or rest position.

The mechanism has a rear wall 25 upon which are supported three coil and core assemblies, the latter being designated at 26, 27 and 28 (Figure 2). Each of said assemblies has associated therewith a core (shown at 26*a*, 27*a* and 28*a*, respectively) and each core carries a screw member (see 26*b*, 27*b* and 28*b*) which extends into threaded engagement with the core bar 29. The core bar is generally C-shaped, in plan, and the free ends thereof are provided with tabs adapted to engage the upper and lower surfaces of inturned flanging 30 and 31 associated with the upper edge portion of walls 22*a* and 22*b*, respectively. Those tabs which bear against the upper surface of flange 31 are identified at 32—32, in Figures 2 and 6, whereas outturned tabs which lie adjacent to the lower surface of flange 30, appear at 33—33, in Figure 4. In this manner the core bar 29 is mounted for reciprocatory movements toward and away from the inductance coils 26, 27 and 28 and, by virtue of the connection between said core bar and the core members, per se, adjustment of the inductors results from effecting such reciprocatory movements of the said core bar. It is to be noted that the cores are in driven engagement with the core bar at points spaced therealong and it is therefore of prime importance that movements of the core bar be rectilinear in nature, in order that the apparatus may be adjusted repetitively, and with accuracy.

Figure 4:
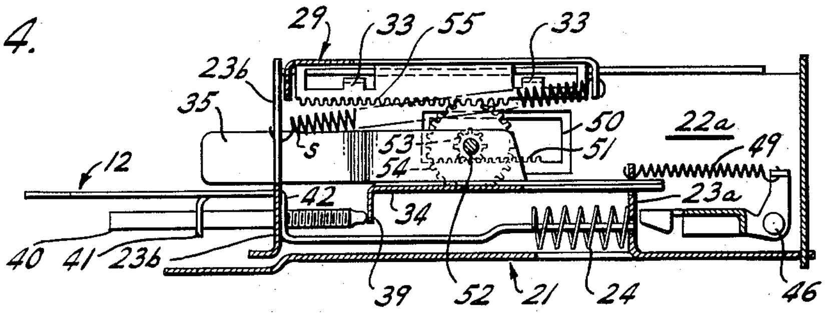
Figure 4 is a sectional view taken as indicated by the line 4—4 of Figure 2.

Underlying the core bar 29 is the aforesaid key bar 34 (see particularly Figures 4 and 6). The key bar is provided with forwardly extending tongues 35 and 36 which project through apertures provided in the front lateral portion of the forward support flange 23*b*. At the center of the rearward edge of the key bar a tongue 37 extends through a slot provided in the rear support flange 23*a* and, as will be best appreciated from the showings of Figures 2 and 6, the tongues 35, 36 and 37 provide three-point sliding support accommodating reciprocatory movements of the key bar 34 under the influence of the aforementioned push-buttons.

Now making reference to the manner in which the push-buttons are adapted to effect reciprocatory movements of the key bar 34, it will be clear from Figures 4 and 6 that each push-button is provided with a recessed central portion, see for example the portion 38 of key bar 15 (Figure 6) within which recessed portions extends a flange 39, which latter depends from the forward edge of the key bar 34. As appears to best advantage in Figure 6, each key bar carries an adjustable screw element 40, each such screw element being journalled in a lug 41, and threadedly engaged with wall portion 42 of the push-button. Thus each push-button includes an adjustably mounted screw element the free end of which is disposed in confronting relation with respect to flange 39. Since, as will be clarified in what follows, the distances through which all the push-buttons may be moved are equal, the extent to which the key bar will be moved, by manipulation of any desired one of the push-buttons, is determined by the adjustment of the screw element 40. As will be understood, the screw elements 40 are adjusted in such manner that each push-button—when actuated—will move the key bar, and the associated core bar, to a position in which the desired one of a number of preselected broadcast stations will be received. As shown in Figures 1 and 2, each push-button carries, at its outer end, a cap member 43 through which the outer ends of each of the screw elements 40 may be adjusted, thus to provide for preselection of the desired stations without necessitating access to the interior of the receiver.

As indicated above, all the push-buttons are adapted to move through equal distances, during the course of which movement the associated screw elements 40 are brought into engagement with the key bar and the tuning function is performed. Outward movement of the several push-buttons is limited by contact of the aforesaid wall portion 42 (Figures 4 and 6) with forward mounting flange 23b and the extent of inward movement of each push-button is limited by cooperation between the aforesaid lug 41 and the flange 23b.

Figure 9:
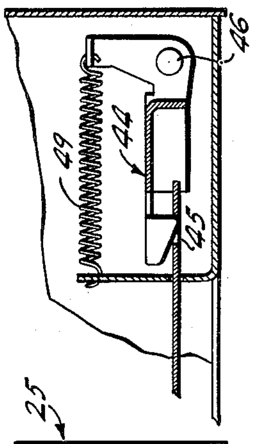
Figure 8:
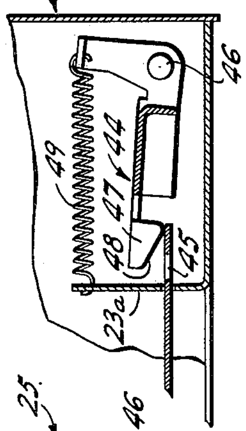
Figure 7:
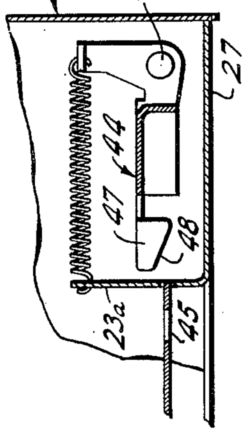

The functioning of the latch bar may be clearly understood by making reference to Figures 7 to 9. As shown in these figures, each push-button has a slot or aperture 45 spaced somewhat inwardly of the free end of that portion of the push-button which passes through mounting flange 23a. Latch bar 44 is mounted for pivotal movements about a pair of pins secured to the side wall portions of the mechanism, one of said pins being shown at 46, in each of Figures 7 to 9. Further, the latch bar carries a plurality of downwardly extending detents 47 each of which is provided with a cam surface 48 angled upwardly toward the free end of the confronting push-button. A spring 49 reacts between mounting flanges 23a and a short lug extending upwardly from the latch bar. As shown in Figure 7, in which the illustrated push-button occupies its outer or rest position, when the button is moved inwardly, the latch bar 44 is rotated upwardly through the agency of contact of the free end of the push-button with the aforementioned cam surface 48. When the button has been depressed (Figure 9) the detent 47 has moved downwardly, under the influence of spring 49, and extends within the aperture 45. When this position has been reached, the push-button remains in the inner or depressed position until a second push-button is manipulated. In response to such additional manipulation, the latch bar is again swung upwardly, by virtue of contact of said second button with a corresponding one of the detents 47, with the result that the previously actuated button is released and the second button is retained, in the manner just described.

As set forth in the statements of object and advantage, supra, the construction of the device is such that movements of both the key bar and core bar are purely rectilinear, and this feature is realized in the manner now to be described, with particular reference to Fiures 3 and 4.

Each of the side walls 22a and 22b is provided with an aperture 50 the lower edge of which is formed to provide a rack 51. Journalled in the rear portions of guide tongues 35 and 36 is a cross rod 52 which carries, at either end thereof, gear assemblies comprising a pair of pinions 53 and 54 (see particularly Figure 6). The pinion assemblies, and the manner in which they cooperate with the associated rack 51, are identical.

When the key bar has been assembled in the mechanism, being positioned by the aforesaid tongues 35, 36 and 37, the smaller pinions 53 are in engagement with the associated racks 51 and, since the rod 52 is journalled in structure carried by the key bar, force exerted along any portion of the flange 39 results in straight-line movement of the key bar toward the rear portion of the apparatus. Cocking or twisting movements of the key bar are impossible, because of the geared connection between the pinions 53 and the racks 51.

As clearly seen in Figures 4 and 6, the rearwardly extending portions of the core bar are each provided—along the lower edges thereof—with a second rack 55, each of these latter racks being in driven engagement with an associated one of the larger pinions 54. By virtue of this arrangement the rectilinear movements of the key bar are imparted to the core bar, since uniform driving motion is applied to each end of said core bar, in response to inward movement of the key bar. A pair of springs S—S react between the core bar and the fixed framing, said springs being effective to return the core bar—and hence the key bar—to rest position (Figure 2), when the push-buttons are not in use.

While, in the broader aspect of the invention, the apparatus might be modified in such manner that a single pinion engages both the upper and lower racks, it is preferred that an additional pinion (the larger pinion 54) engage the upper rack since, in this way, it is possible to adjust and increase the ratio between the displacement movements of the key bar, as compared with the resultant travel of the core bar. Assuming, by way of example, and as is preferred in practice, that the maximum travel which any push-button can impart to the key bar results in approximately one hundred eighty degrees rotation of the pinions 53, it will be understood that the core bar is displaced a distance equivalent to one-half the circumference of the smaller pinion plus one-half the circumference of the larger pinion. Although the travel of the core bar—for a given movement of the key bar—may be varied as desired, in an embodiment which has provide highly satisfactory in practice, displacement movements of the core bar are equal to 3.8 times the displacement movements of the key bar. If, as suggested above, a single pinion directly engages both racks, the displacement of the core bar will be equal to twice that of the key bar.

As indicated above, all of the push-buttons travel equivalent distances and, although the distance through which the push-buttons are moved is relatively small, substantial displacements of the core bar are utilized.

Summarizing the action of the mechanism under the automatic mode of operation, and making especial reference to Figure 6, it will be understood that inward movement of the push-button 15 to the position shown, results in the free end of its associated screw element 40 being brought into contact with the flange 39 provided on the forward edge of key bar 34. During movement of the push-button to the illustrated position, in which it is engaged by one of the detents carried by latch bar 44, the key bar—and therefore the core bar—have been moved a distance determined by the extent to which the screw element 40 projects forwardly from the push-button wall portion 42. As will now be understood, depression of another push-button serves to release push-button 15 and to re-position the core bar to a position determined by the adjustment of the screw element associated with the particular push-button then actuated.

Figure 3:
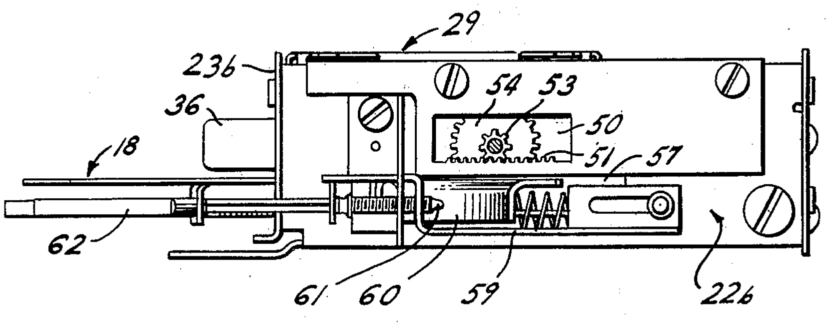
Figure 3 is an elevational illustration taken as looking toward the right-hand end of the mechanism as seen in Figure 2.

Provision is made for ready and accurate tuning of the apparatus under the manual mode of operation, as will now be described. To initiate such mode of operation, the push-button 18 is depressed, moving from the position shown in Figure 2 to the position illustrated in Figure 5. While this particular push-button includes no screw element, and is therefore not effective to move the key bar directly, depression of said push-button serves to bring actuating apparatus—associated with the manual tuning shaft 19—into operative position. To this end, push-button 18 has connected thereto an "outrigger" structure 56 which extends through a slot 57 formed in end wall 22*b*. As appears in Figure 5, the outrigger 56 may conveniently be fixed to the push-button 18 through the agency of a tab 58 secured to said push-button. Overlying the outrigger 56, and also extending outwardly of the housing through slot 57 is an extension 59 formed on the right hand end of key bar 34. This extension is provided with a flange 60 (Figures 3 and 5) adapted to be engaged by a screw element 61 threadedly supported in outrigger 56. Screw element 61 includes a shank portion 62 which is in splined engagement with the interior of manual tuning shaft 19.

Figure 5:
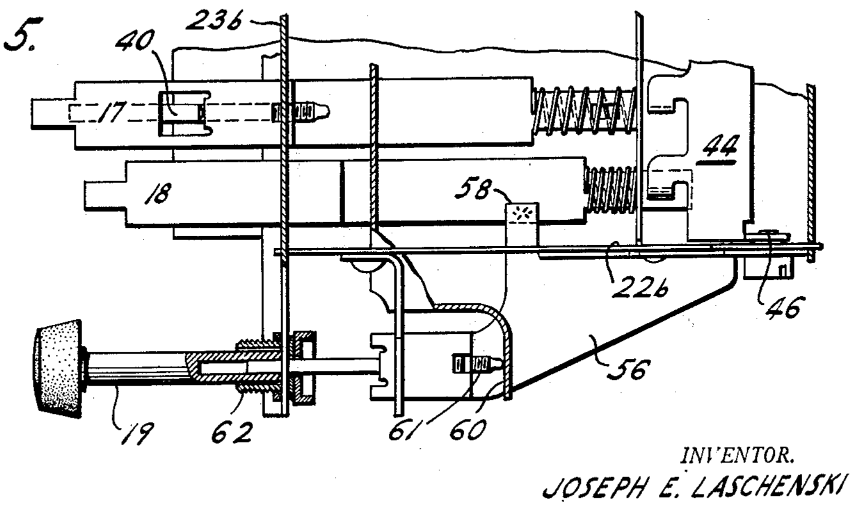
Figure 5 is a fragmentary, plan view, illustrating the mechanism as conditioned for the manual mode of operation.

Upon movement of push-button 18 from the position shown in Figure 2 to the position shown in Figure 5, the outrigger 56 moves forwardly bringing the screw element 61 into engagement with flange 60 of extension 59. By virtue of the splined connection between shank 62 and manual tuning knob or shaft 19, forward movement of screw element 61 is accomplished without necessitating a corresponding displacement of shaft 19. When the position shown in Figure 5 is reached, the key bar—and therefore the core bar—may be moved throughout the entire range of adjustment, by imparting rotary movement to shaft 19. Depression of an additional station-selecting push-button, for example push-button 17, is effective to release the latch bar 44, in the manner already described, and the apparatus is again conditioned for automatic operation.

I claim:

In a tuning mechanism, housing structure, a pair of carriage members at least the major portion of each of which is mounted within said housing structure, one of said carriage members being adapted to be driven during a tuning operation and the other being actuatable by said one carriage member to position a frequency-determining device, a plurality of selectively actuatable control elements, said elements being mounted for longitudinal reciprocatory movements into and out of driving engagement with said one carriage member to effect movement of the latter to various positions under control of said elements, support means carried by one of said control elements and having a portion extending exteriorly of said housing structure, and adjustable means carried by the said portion, and disposed for driving engagement with said one carriage member, said adjustable means—by virtue of being carried by said portion—being brought into such driving engagement in response to longitudinal movement of the said one control element.

JOSEPH E. LASCHENSKI.

REFERENCES CITED

The following references are of record in the file of this patent:

UNITED STATES PATENTS

| Number | Name | Date |
|---|---|---|
| 2,340,393 | Leishman | Feb. 1, 1944 |
| 2,388,581 | Soffietti | Nov. 6, 1945 |

FOREIGN PATENTS

| Number | Country | Date |
|---|---|---|
| 20,587 | Great Britain | Sept. 30, 1908 |